US010814797B2

(12) United States Patent
Thain et al.

(10) Patent No.: US 10,814,797 B2
(45) Date of Patent: Oct. 27, 2020

(54) PORTABLE ELECTRONIC DEVICE SUPPORT ASSEMBLY

(71) Applicant: Ford Global Technologies, LLC, Dearborn, MI (US)

(72) Inventors: Gavin Thain, Wickford (GB); Phil Bunn, South Woodham Ferrers (GB)

(73) Assignee: Ford Global Technologies, LLC, Dearborn, MI (US)

( * ) Notice: Subject to any disclaimer, the term of this patent is extended or adjusted under 35 U.S.C. 154(b) by 220 days.

(21) Appl. No.: 15/957,119

(22) Filed: Apr. 19, 2018

(65) Prior Publication Data

US 2018/0345874 A1    Dec. 6, 2018

(30) Foreign Application Priority Data

Jun. 5, 2017 (GB) .................................. 1708899.8

(51) Int. Cl.
*B60R 11/00* (2006.01)
*B60R 11/02* (2006.01)

(52) U.S. Cl.
CPC ...... *B60R 11/0241* (2013.01); *B60R 11/0252* (2013.01); *B60R 11/0258* (2013.01);
(Continued)

(58) Field of Classification Search
CPC ............. B60R 11/0229; B60R 11/0235; B60R 11/0241; B60R 11/0252; B60R 11/0258;
(Continued)

(56) References Cited

U.S. PATENT DOCUMENTS 2,719,066 A * 9/1955 Budzinski .............. A47B 31/06
108/33
4,947,661 A * 8/1990 Yoshida ................. B60K 37/04
70/57
(Continued)

FOREIGN PATENT DOCUMENTS

CN      101172472 A      5/2008
DE      19539784 A1 *    4/1997
(Continued)

*Primary Examiner* — Jonathan Liu
*Assistant Examiner* — Guang H Guan
(74) *Attorney, Agent, or Firm* — David Coppiellie; Price Heneveld LLP (57) ABSTRACT

A portable electronic device support assembly for a vehicle comprises a housing for placement, a link arm slidably coupled to the housing at a first end of the link arm, and a device support configured to receive a portable electronic device and rotatably coupled to the link arm at a second end of the link arm. The link arm and device support are movable between stowed and deployed positions. A latching mechanism configured to resist movement of the link arm in the deployed position, the latching mechanism comprising a latch movably coupled to the link arm. The latch is resiliently biased such that the latch engages a recess in the housing when the link arm is in the deployed position. An interaction between the device support and the latching mechanism retracts the latch from the recess as the device support rotates relative to the link arm when moving towards the stowed position.

16 Claims, 10 Drawing Sheets

(52) U.S. Cl.
CPC ............... *B60R 2011/0005* (2013.01); *B60R 2011/0071* (2013.01); *B60R 2011/0082* (2013.01); *B60R 2011/0085* (2013.01); *B60R 2011/0094* (2013.01)

(58) Field of Classification Search
CPC ..... B60R 2011/0005; B60R 2011/0071; B60R 2011/0075; B60R 2011/0082; B60R 2011/0084; B60R 2011/0085; B60R 2011/0094; A47B 5/006
USPC ............................. 296/37.12; 224/281, 282
See application file for complete search history.

(56) References Cited

U.S. PATENT DOCUMENTS

| | | | | |
|---|---|---|---|---|
| 5,141,194 | A * | 8/1992 | Burgess | B60N 3/102 248/150 |
| 5,374,104 | A * | 12/1994 | Moore | A47C 7/72 297/188.16 |
| 6,381,133 | B1 * | 4/2002 | Chen | B60R 11/0252 248/918 |
| 6,427,959 | B1 | 8/2002 | Kalis et al. | |
| 6,754,070 | B2 * | 6/2004 | Chen | B60R 11/02 361/679.26 |
| 6,945,582 | B2 * | 9/2005 | Chen | B60R 11/02 224/539 |
| 7,088,589 | B2 * | 8/2006 | Chen | B60R 11/0235 312/223.1 |
| 7,188,882 | B2 * | 3/2007 | Dry | B60N 3/102 296/37.8 |
| 7,261,266 | B2 * | 8/2007 | Satterfield | B60R 11/0235 248/284.1 |
| 7,306,282 | B2 * | 12/2007 | Salzer | A47C 7/70 297/145 |
| 7,388,755 | B2 * | 6/2008 | Chen | G06F 1/1601 312/223.1 |
| 7,721,657 | B2 * | 5/2010 | Carstensen | A47B 5/006 108/134 |
| 7,963,231 | B2 * | 6/2011 | Osborne | A47B 5/006 108/40 |
| 8,459,603 | B2 * | 6/2013 | Baudisch | B60K 35/00 248/292.14 |
| 8,523,130 | B2 * | 9/2013 | Westerink | B64D 11/0015 16/363 |
| 8,624,547 | B2 * | 1/2014 | Thorsell | B60N 3/002 320/108 |
| 8,646,393 | B2 * | 2/2014 | Souillac | B60R 11/00 108/45 |
| 8,708,296 | B2 * | 4/2014 | Nemoto | B60R 11/02 248/316.4 |
| 9,014,393 | B2 * | 4/2015 | Huh | B60R 11/02 381/386 |
| 9,115,843 | B2 * | 8/2015 | Huang | F16M 11/10 |
| 9,403,489 | B2 * | 8/2016 | Angeletti | B60R 11/0241 |
| 9,809,141 | B2 * | 11/2017 | Jain | B60N 3/108 |
| 9,902,339 | B2 * | 2/2018 | Gilling | B60R 11/02 |
| 10,155,483 | B2 * | 12/2018 | Catlin | B60R 11/0241 |
| 10,272,846 | B2 * | 4/2019 | Tapti | B60R 11/0241 |
| 10,391,950 | B2 * | 8/2019 | Vander Sluis | B60R 11/02 |
| 10,569,719 | B2 * | 2/2020 | Yamada | B60R 11/0241 |
| 2008/0174136 | A1 | 7/2008 | Welschholz et al. | |
| 2008/0284198 | A1 | 11/2008 | Ryu | |
| 2012/0049558 | A1 | 3/2012 | Souillac | |
| 2012/0097725 | A1 | 4/2012 | Lee | |
| 2015/0192155 | A1 | 7/2015 | Chen | |
| 2015/0343962 | A1 * | 12/2015 | Le Leizour | B60R 11/02 361/809 |
| 2018/0345874 | A1 * | 12/2018 | Thain | B60R 11/0241 |

FOREIGN PATENT DOCUMENTS

| | | |
|---|---|---|
| DE | 102013106649 A1 | 9/2014 |
| DE | 102014107987 A1 | 12/2014 |
| DE | 102015210246 A1 | 12/2016 |
| EP | 2431229 A1 | 3/2012 |
| FR | 2976875 A1 | 12/2012 |
| KR | 101267355 B1 | 5/2013 |
| KR | 20160120042 A | 10/2016 |
| WO | 2012114957 A1 | 8/2012 |
| WO | 2013072794 A1 | 5/2013 |
| WO | 2016060477 A1 | 4/2016 |

* cited by examiner

PORTABLE ELECTRONIC DEVICE SUPPORT ASSEMBLY

FIELD OF THE INVENTION

The present disclosure generally relates to a portable electronic device support assembly, and more particularly relates to a portable electronic device support assembly comprising a housing, a link arm, a device support and a latching mechanism configured to resist movement of the link arm in the deployed position.

BACKGROUND OF THE INVENTION

The owner of a vehicle, such as a motor vehicle, may wish to mount a portable electronic device, such as a mobile phone or satellite navigation system, into their vehicle to add additional functionality. Typical after-market device support solutions often present the device in a location that may obscure vehicle controls or affect driving visibility. This may occur, for example, by attaching the device via suction cup to the windscreen. Furthermore, many after-market device support solutions are often not particularly secure.

It is desirable for a mount to be deployed and presented into a more convenient location and then folded away into the original vehicle architecture when not required. In addition, it is desirable to support the device more securely than after-market solutions during vehicle use.

SUMMARY OF THE INVENTION

According to a first aspect of the present disclosure, a portable electronic device support assembly for a vehicle is provided. The portable electronic device support assembly for a vehicle includes a housing for placement in a trim portion of the vehicle, and a link arm slidably coupled to the housing at a first end of the link arm. The assembly also includes a device support configured to receive a portable electronic device and rotatably coupled to the link arm at a second end of the link arm, wherein the link arm and device support are movable between a stowed position in a pocket of the housing, and a deployed position extending from the housing. The device further includes a latching mechanism configured to resist movement of the link arm in the deployed position, the latching mechanism comprising a latch movably coupled to the link arm, wherein the latch is resiliently biased such that the latch engages a recess in the housing when the link arm is in the deployed position and wherein an interaction between the device support and the latching mechanism retracts the latch from the recess as the device support rotates relative to the link arm when moving towards the stowed position.

The portable electronic device support assembly may further comprise a latching mechanism configured to resist movement of the link arm in the deployed position. The latching mechanism may comprise a latch movably coupled to the link arm. The latch may be resiliently biased such that the latch engages a recess in the housing when the link arm is in the deployed position. An interaction between the device support and the latching mechanism may retract the latch from the recess as the device support rotates relative to the link arm when moving towards the stowed position.

The latch may comprise a cam surface and the device support may comprise an engaging portion configured to interact with the latch cam surface as the device support rotates relative to the link arm when moving towards the stowed position. The cam surface may be provided at or towards a first end of the latch. The latch may be slidably disposed relative to the link arm. The latch may be substantially elongate.

The latch mechanism may comprise a spring configured to resiliently bias the latch into engagement with the recess of the housing. The latch may comprise a second end configured to engage the recess of the housing. The latch may be provided within a cavity of the link arm. The second end of the latch may protrude from the cavity. The link arm may comprise an opening into the cavity that exposes the cam surface.

The device support and link arm may be aligned once the device support has interacted with the latching mechanism to retract the latch. The device support and link arm may be aligned in the stowed position.

The device support may rotate relative to the link arm about a pivot point between ends of the device support. The engaging portion of the device support may be provided between the pivot point and a top end of the device support when in the deployed position. The link arm may be slidably and rotatably coupled to the housing at the first end of the link arm.

The device support may rotate between the deployed and stowed positions so that a bottom end of the device support when in the deployed position becomes a top end when in the stowed position.

The link arm may comprise laterally spaced apart first and second arm portions. The device support may be provided between the first and second arm portions. The device support may be rotatably coupled at distal ends of the first and second arm portions. The first and second arm portions may define a space between the first and second arm portions for receiving a portion of the device support when in the stowed position.

The latching mechanism may comprise a pair of latches. The latches may extend into respective first and second arm portions.

One of the device support and link arm may comprise a resiliently biased element. The other of the device support and link arm may comprise a recess for receiving the resiliently biased element, e.g., in the stowed and/or deployed position. The resiliently biased element and recess may be configured to provide an initial resistance to the relative rotation of the device support and link arm, e.g., away from the stowed and/or deployed position.

The device support may comprise a ledge for receiving an edge of the portable electronic device. The device support may comprise an adjustable clamp for receiving an opposite edge of the portable electronic device. The clamp may be received in the space between the first and second arm portions of the link arm when in the stowed position.

The device support and link arm may comprise corresponding abutment surfaces that interact to limit rotation of device support relative to link arm. The link arm and housing may comprise corresponding abutment surfaces that interact to limit sliding of the link arm relative to the housing. The link arm and housing may comprise corresponding abutment surfaces that interact to limit rotation of the link arm relative to housing.

The portable electronic device support assembly may further comprise a further latching mechanism configured to resist movement of the device support relative to the link arm in the deployed position. The further latching mechanism may comprise a further latch movably coupled to the device support. The further latch may lockingly engage a recess in the link arm. The further latch may be resiliently biased into an engaged (e.g., locked) position. The further latch may be manually retracted by a user. Alternatively, the further latch may be resiliently biased into a disengaged position. An interaction between the portable electronic device or the clamp and the further latching mechanism may cause the further latch to move into the engaged position, e.g., as the portable electronic device is placed on or secured to the device support.

The portable electronic device may be a mobile telephone (e.g., smartphone), tablet, satellite navigation device or any other handheld electronic device. A trim portion, such as a dashboard or instrument panel, of a vehicle may comprise the aforementioned portable electronic device support assembly. A vehicle, such as a motor vehicle, may comprise the aforementioned portable electronic device support assembly or the aforementioned trim portion.

According to a second aspect of the present invention, a portable device support assembly is provided. The portable device support assembly includes a housing, and a link arm slidably coupled to the housing at a first end of the link arm. The assembly also includes a device support configured to receive a portable device and rotatably coupled to a second end of the link arm and movable between a stowed position in a pocket, and a deployed position, and a latching mechanism configured to resist movement of the link arm in the deployed position.

According to a third aspect of the present invention, a vehicle is provided. The vehicle includes a trim portion and a portable electronic device support assembly. The assembly includes a housing in the trim portion, and a link arm slidably coupled to the housing at a first end of the link arm. The assembly also includes a device support configured to receive a portable electronic device and rotatably coupled to the link arm at a second end of the link arm, wherein the link arm and device support are movable between a stowed position in a pocket of the housing, and a deployed position extending from the housing. The assembly further includes a latching mechanism configured to resist movement of the link arm in the deployed position, the latching mechanism comprising a latch movably coupled to the link arm, wherein the latch is resiliently biased such that the latch engages a recess in the housing when the link arm is in the deployed position and wherein an interaction between the device support and the latching mechanism retracts the latch from the recess as the device support rotates relative to the link arm when moving towards the stowed position.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
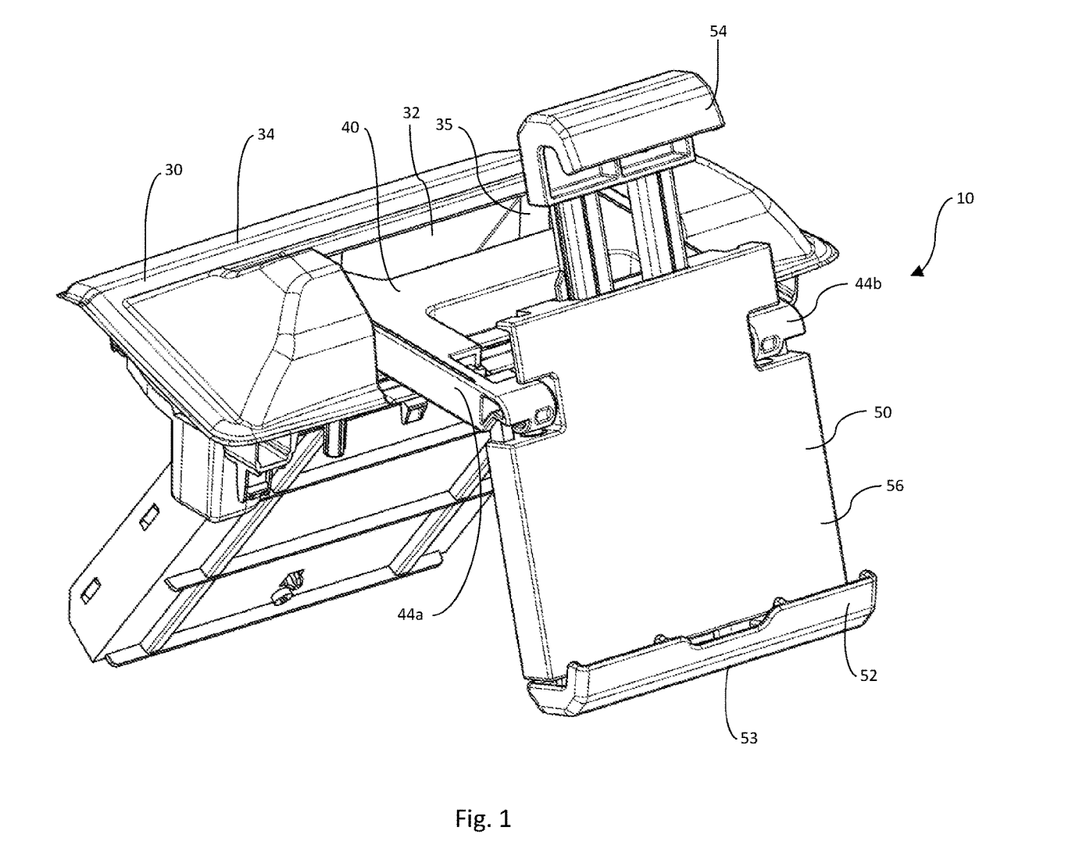
FIG. 1 is a perspective view showing a portable electronic device support assembly in a deployed position according to an embodiment of the present disclosure.
Figure 2A:
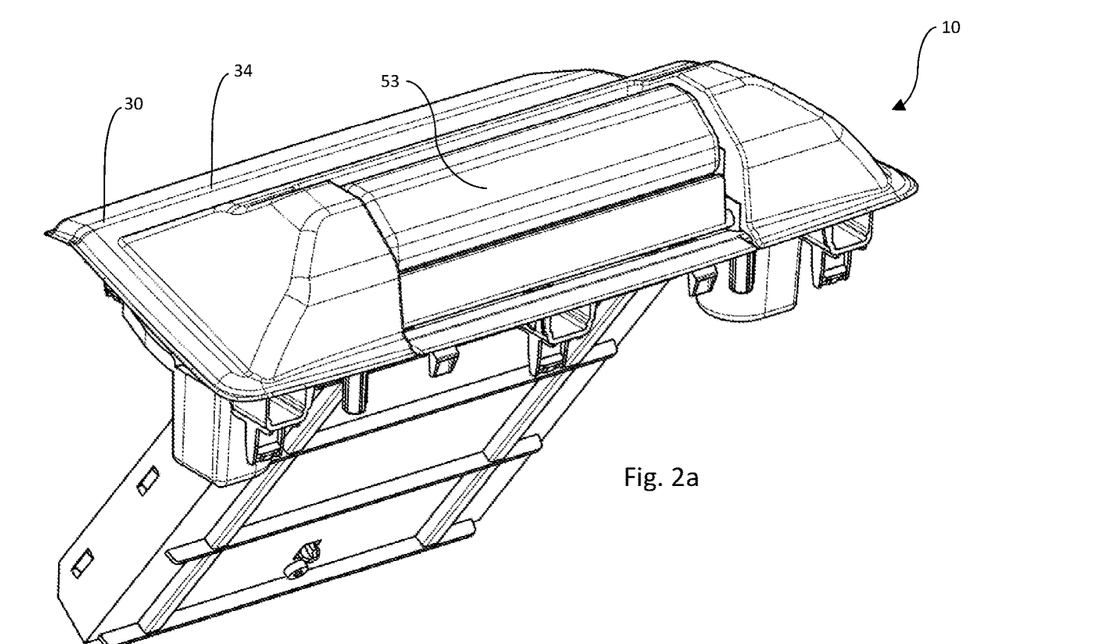
FIG. 2a is a perspective view showing the progression of the portable electronic device support assembly shown in a stowed position to a deployed position.
Figure 2B:
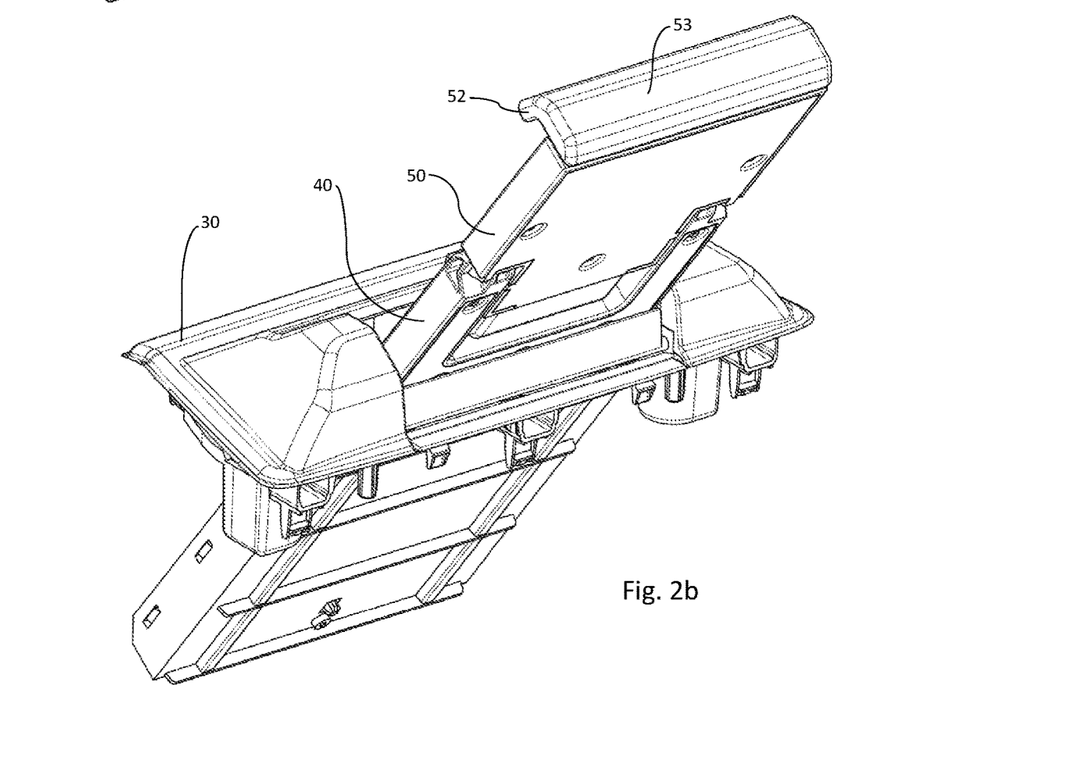
FIG. 2b is a perspective view showing the progression of the portable electronic device support assembly shown in a stowed position to a deployed position.
Figure 2C:
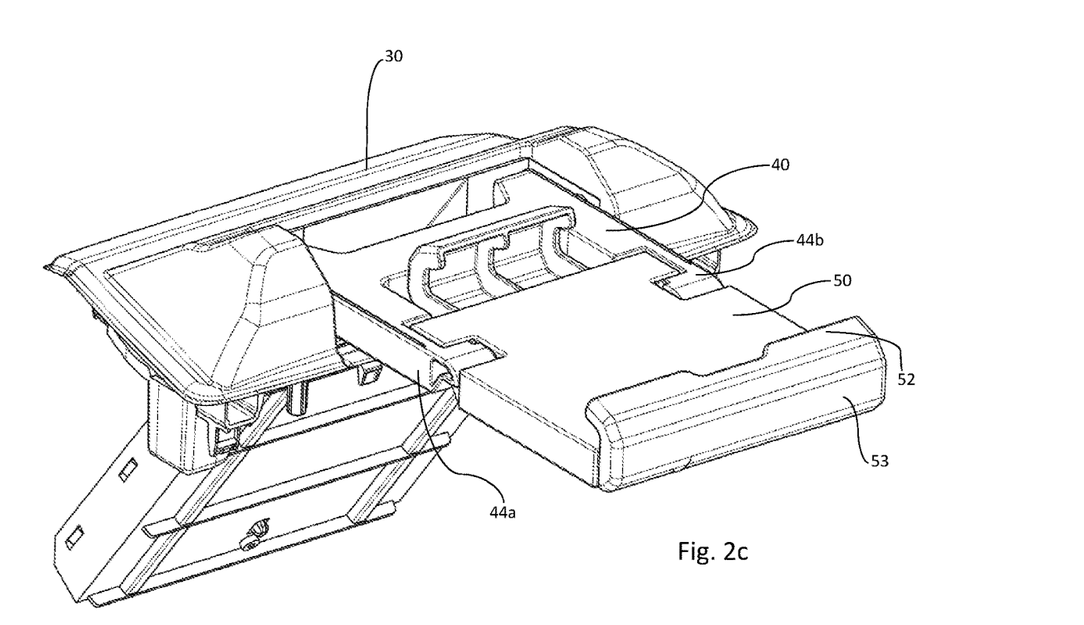
FIG. 2c is a perspective view showing the progression of the portable electronic device support assembly shown in a stowed position to a deployed position.
Figure 2D:
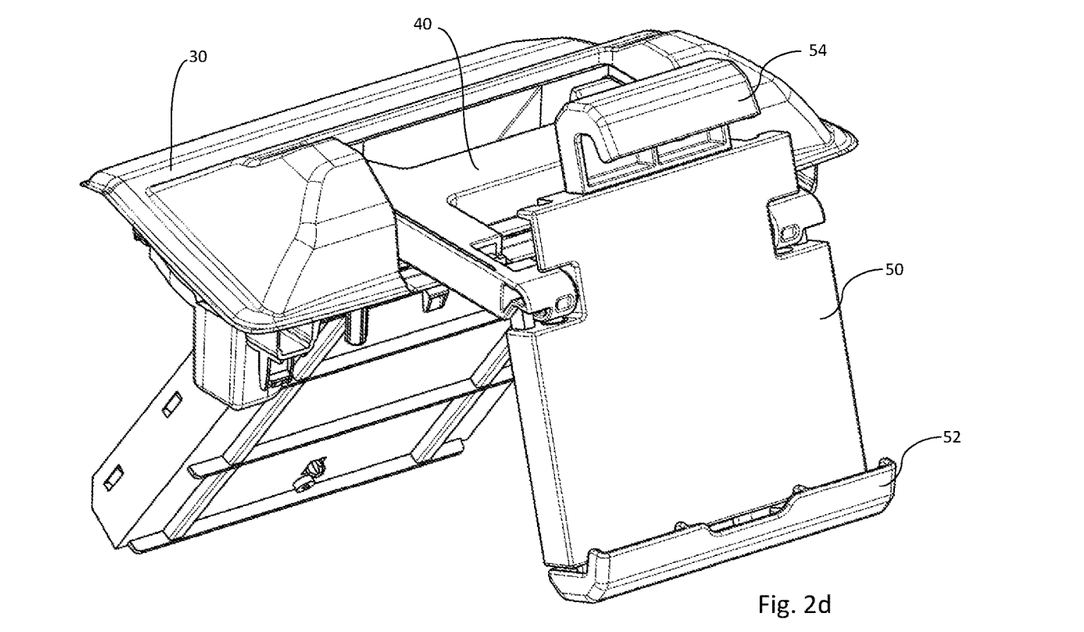
FIG. 2d is a perspective view showing the progression of the portable electronic device support assembly shown in a stowed position to a deployed position.
Figure 2E:
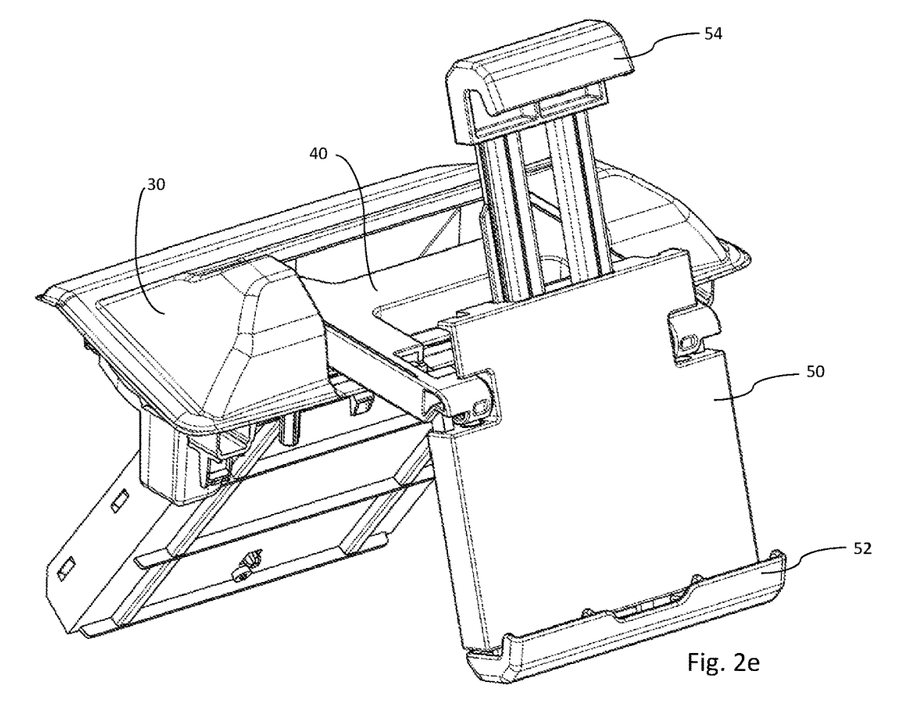
FIG. 2e is a perspective view showing the progression of the portable electronic device support assembly shown in a stowed position to a deployed position.
Figure 2F:
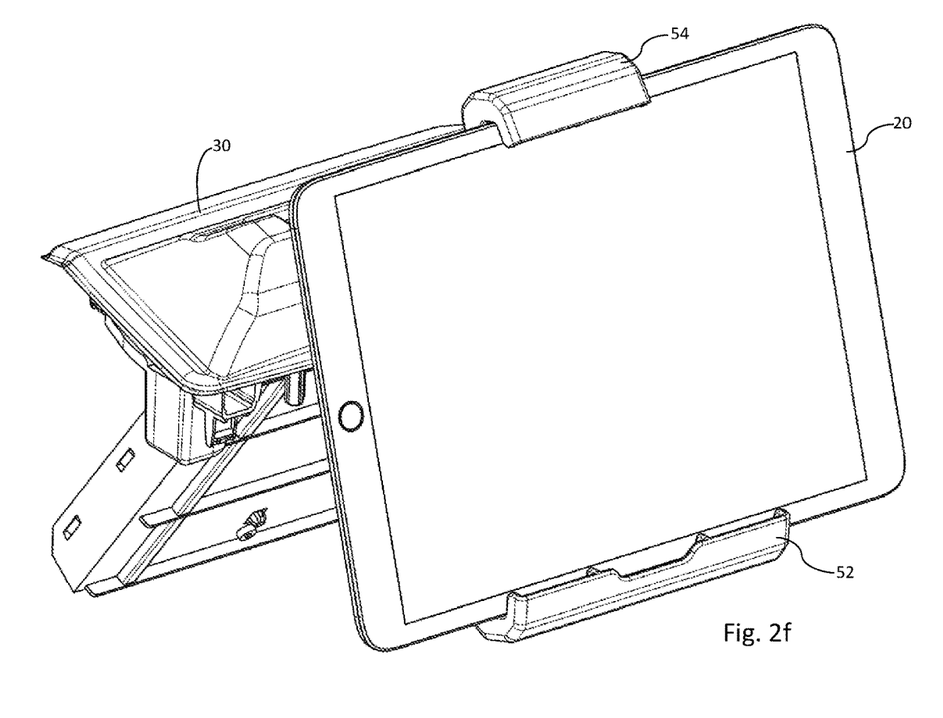
FIG. 2f is a perspective view showing the progression of the portable electronic device support assembly shown in a stowed position to a deployed position.

With reference to FIGS. 1-2f, the present disclosure relates to a support assembly 10 configured to support a portable electronic device 20. The support assembly 10 may be provided in the trim of a vehicle, such as a motor vehicle, and in particular, the support assembly 10 may be provided in the dashboard or instrument panel of a vehicle. The portable electronic device 20 may be a mobile telephone, tablet, satellite navigation device or any other handheld electronic device. The support assembly 10 may move between a stowed position, as depicted in FIG. 2a, and a deployed position, as depicted in FIG. 2e. In the stowed position, the support assembly is substantially flush with the surrounding trim. In the deployed position, the support assembly is capable of supporting the portable electronic device 20 so that an occupant of the vehicle may view a display of the portable electronic device and/or interact with the portable electronic device. The support assembly 10 may hold the portable electronic device 20 securely.

The support assembly 10 comprises a housing 30, a link arm 40 and a device support 50 upon which the portable electronic device 20 may be placed. The housing 30 defines a pocket 32 in which the link arm 40 and device support 50 may be received when the link arm and device support are in the stowed position. The vehicle trim may comprise a cavity for receiving the housing 30. The housing 30 may comprise a surface 34, which is configured to be flush with the surrounding trim of the vehicle (not shown). An opening 35 may be provided in the surface 34 so as to provide access to the pocket 32.

Figure 3:
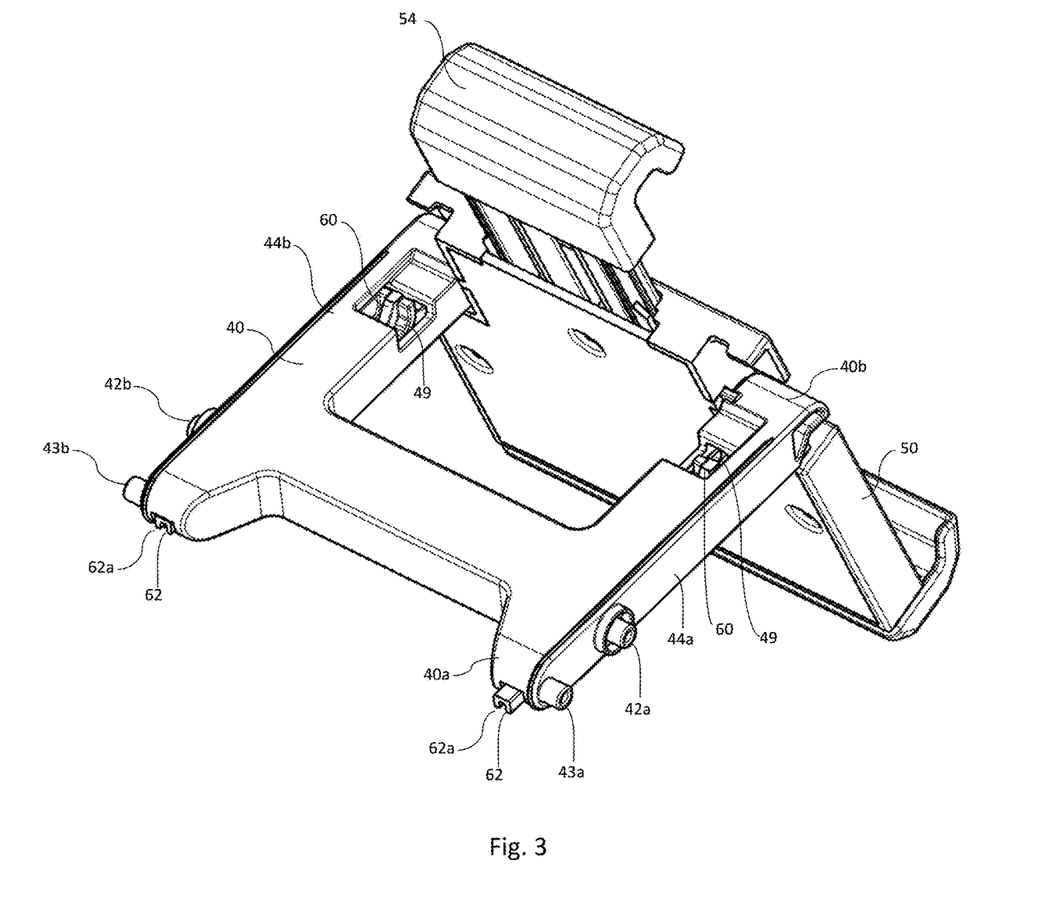
FIG. 3 is a partial perspective view showing a link arm and device support of the portable electronic device support assembly according to one embodiment.
Figure 4:
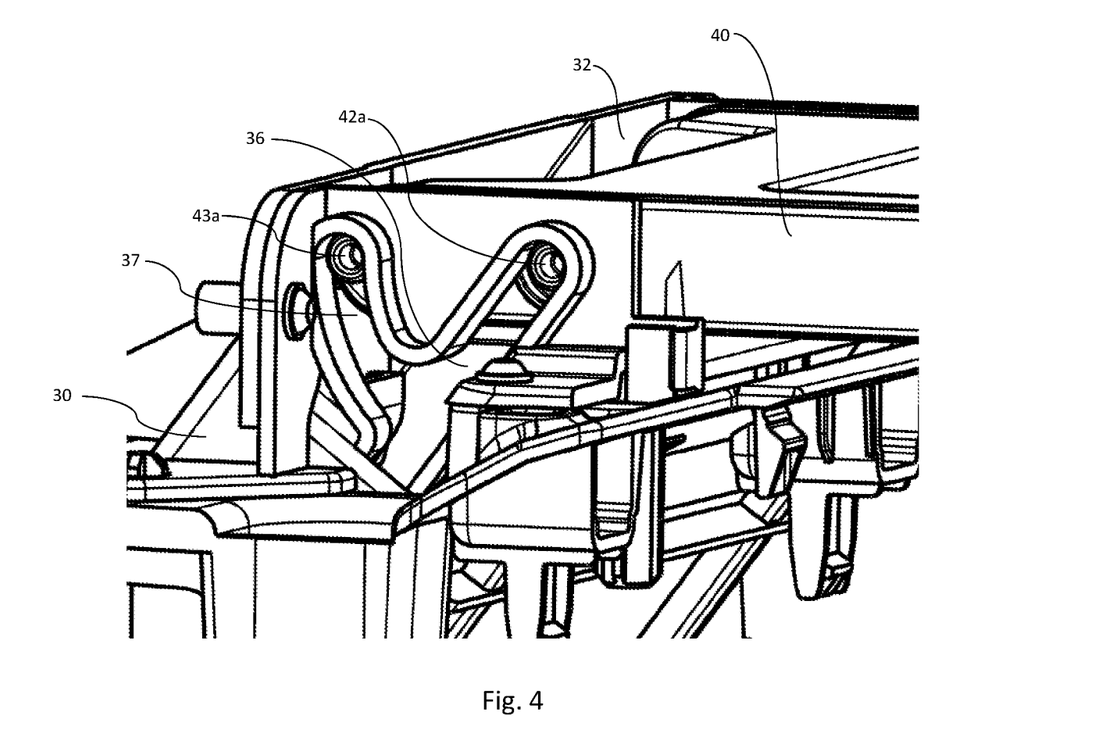
FIG. 4 is a partial perspective view further showing the link arm and a housing of the portable electronic device support assembly.

Referring now to FIGS. 3 and 4, the link arm 40 is slidably coupled to the housing 30. In the particular example shown, the link arm 40 is slidably and rotatably coupled to the housing 30. The link arm 40 may reside in the pocket 32 when in the stowed position and the link arm 40 may slide out of the pocket 32. When the link arm 40 has reached the end of the sliding travel, the link arm 40 may rotate relative to the housing 30. To facilitate this movement, the pocket 32 may comprise side walls with grooves 36 which receive corresponding pins 42a, 42b provided at or near a first end 40a of the link arm 40. The pins 42a, 42b may slide in the grooves 36. The link arm 40 may rotate about the pins 42a, 42b when the pins have reached the end of the corresponding grooves. The link arm 40 may be provided with additional pins 43a, 43b, which may slide in corresponding additional grooves 37 in the side walls of the pocket 32 when the link arm has reached the end of its sliding travel and the link arm is rotating about the pins 42a, 42b. The additional groove 37 may branch from the groove 36 before the end of the groove 36. The additional groove 37 may follow an arc shaped path. An end of the additional groove 37 may provide an abutment to limit further rotation of the link arm 40 relative to the housing 30. In an alternative embodiment, the additional pins 43a, 43b may be omitted and the link arm 40 may rest against a surface of the housing 30 so as to limit further rotation of the link arm 40.

The device support 50 is rotatably coupled to the link arm 40 at a second end 40b of the link arm, which is opposite to the first end 40a of the link arm. As is best depicted in FIG. 2c, the link arm 40 comprises laterally spaced apart first and second arm portions 44a, 44b. The device support 50 may be provided between the first and second arm portions 44a, 44b and the device support 50 may be rotatably coupled at distal ends of the first and second arm portions 44a, 44b. The first and second arm portions 44a, 44b may define a space therebetween, which may receive a portion of the device support 50 when in the stowed position.

The device support 50 may comprise a ledge 52 adapted to receive an edge of the portable electronic device 20. The ledge 52 may be provided at a bottom end of the device support 50 when in the deployed position. The device support 50 may comprise a clamp 54 for receiving an opposite edge of the portable electronic device 20. The clamp 54 may be adjustable, e.g., slidably adjustable, so that portable electronic devices of different sizes may be accommodated. The clamp 54 may be provided at the top end of the device support 50 when in the deployed position. The clamp 54 may be resiliently biased towards the ledge 52, e.g., by virtue of a spring 51 (depicted in FIG. 8). The ledge 52 and/or clamp 54 may comprise a lip that extends over the corresponding edge of the portable electronic device 20 so as to further ensure that the portable electronic device is securely held in place on the device support 50. The device support 50 may otherwise present a substantially flat surface 56 upon which the portable electronic device 20 may rest. The surface 56 of the device support may comprise a non-slip layer formed from a material with a coefficient of friction that resists sliding movement of the portable electronic device 20 relative to the surface 56.

Referring now to FIGS. 2a-2f, the progression of the support assembly 10 from the stowed position to the deployed position will now be described. FIG. 2a shows the support assembly 10 in the stowed position. As depicted, the link arm 40 and device support 50 are retracted into the pocket 32 of the housing 30. An underside 53 of the ledge 52 faces outwardly and may be substantially flush with the surrounding surface 34 of the housing 30. Referring now to FIG. 2b, the link arm 40 and device support 50 may be retracted from the housing pocket 32. As depicted, the link arm 40 and device support 50 may be substantially aligned as they are retracted from the pocket 32. The device support 50 may be retracted by a user gripping the ledge 52 and applying a force to withdraw the device support 50 from the housing pocket 32. Additionally or alternatively, the link arm 40 may be spring loaded and the ledge 52 may be depressed into the housing pocket 30 to release the link arm 40 and allow a spring to at least initiate movement of the link arm 40 out of the housing pocket 32. Referring now to FIG. 2c, the link arm 40 and device support 50 may together rotate relative to the housing 30. Rotation of the link arm 40 relative to the housing 30 may be limited by the additional pins 43a, 43b as mentioned above. The device support 50 may then rotate relative to the link arm 40 as shown in FIG. 2d. The clamp 54 may then be extended as depicted in FIG. 2e. The portable electronic device 20 may then be placed on the device support 50 so as to rest on the ledge 52 and the clamp 54 may be lowered into engagement with a top edge of the portable electronic device 20, as is shown in FIG. 2f.

Referring again to FIG. 3, the support assembly 10 further comprises a latching mechanism 60. The latching mechanism 60 may be configured to resist movement of the link arm 40 relative to the housing 30 when in the deployed position. The latching mechanism 60 may be provided in or on the link arm 40. The latching mechanism 60 comprises a latch member 62, which is movably coupled to the link arm 40. In the particular example shown, the latch member 62 is elongate and is provided within a cavity 46 in the link arm 40. The latch member 62 is slidably disposed in the cavity 46 of the link arm 40. In an extended position an end 62a of the latch member 62 protrudes from the link arm 40 at the first end of the link arm. The protruding end 62a of the latch member 62 engages a corresponding recess 31 in the housing 30 when the link arm is in the deployed position. The engagement of the extended end of the latch member 62 in the housing recess 31 may prevent rotation of the link arm 40 relative to the housing 30.

Figure 6:
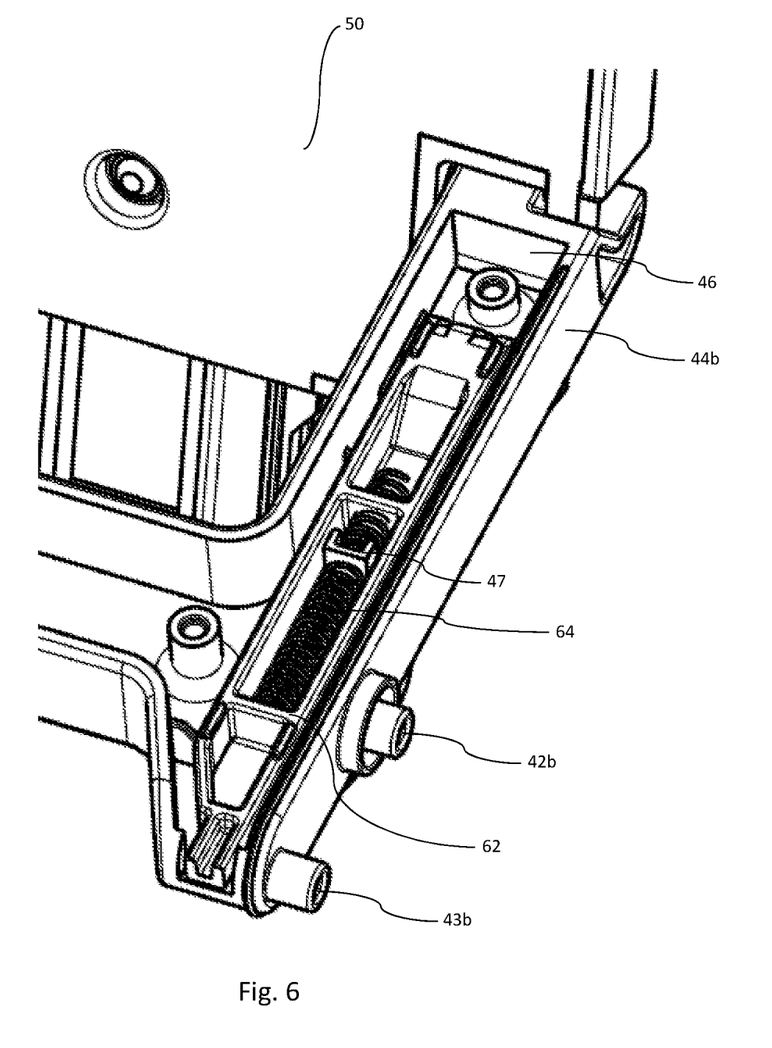
FIG. 6 is an internal perspective view showing an underside of the link arm of the portable electronic device support assembly.

The latch member 62 may be resiliently biased into the engaged position by virtue of a spring 64. As depicted in FIG. 6, one end of the spring 64 may act against the latch member 62 and the other end of the spring may act against an abutment surface 47 of the link arm 40. This way the latch member 62 may be resiliently biased towards the engaged position in which the end 62a of the latch member 62 protrudes from the link arm 40.

The latch member 62 may be retracted by virtue of an interaction between the device support 50 and the latching mechanism 60. In particular, the device support 50 may comprise an engaging portion 58 which engages a cam surface 66 of the latch member 62 as the device support 50 rotates relative to the link arm 40 and into the aligned position. The cam surface 62 may be angled such that as the engaging portion 58 contacts the cam surface 66 and the device support 50 is rotated the latch member 62 may retract. As a result, the extended end 62a of the latch member 62 may withdraw from the housing recess 31 such that the link arm 40 is then free to rotate relative to the housing 30. In this way the link arm 40 may be securely held when in the deployed position and subsequently released when it is desired to be stowed into the housing 30.

As depicted in FIG. 3, the link arm 40 comprises an opening 49 into the internal cavity 46 of the link arm and the opening 49 exposes the cam surface 66 of the latch member 62. This exposure of the cam surface 66 allows the device support engaging portion 58 to interact with the cam surface 66.

Figure 5:
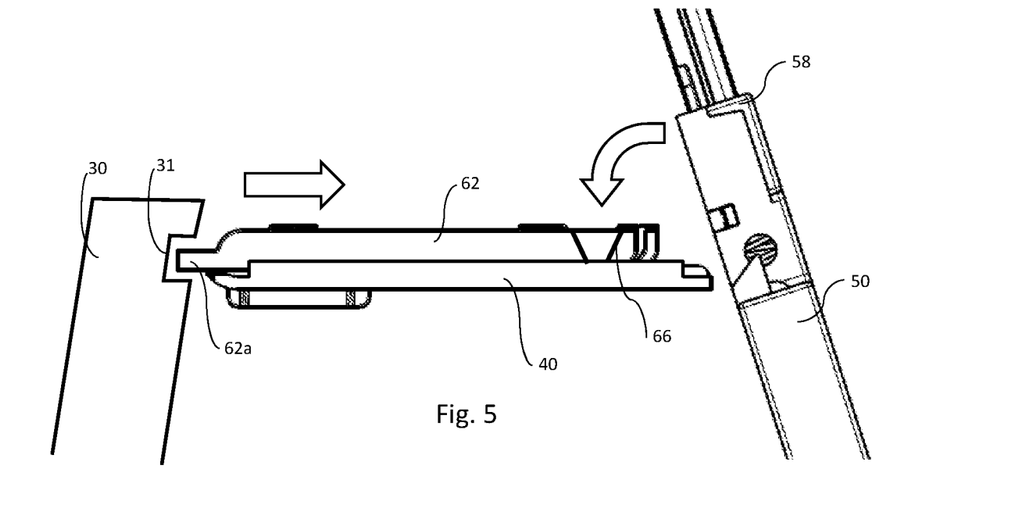
FIG. 5 is a partial side view further showing the link arm and device support of the portable electronic device support assembly.

As is best depicted in FIG. 5, the engaging portion 58 is positioned between the pivot point of the device support 50 and the top end of the device support 50 when in the deployed position. Accordingly, as the device support 50 is rotated so that the device 50 and link arm 40 are brought into alignment, the engaging portion engages the cam surface 66 of the latch member 62.

As mentioned above, the link arm 40 may comprise first and second arm portions 44a, 44b and each of the arm portions may comprise a respective latch member 62. FIG. 3 depicts the latch member 62 for the first arm portion 44a in an extended position. By contrast, the latch member 62 for the second arm portion 44b is depicted in the retracted position.

Figure 7:
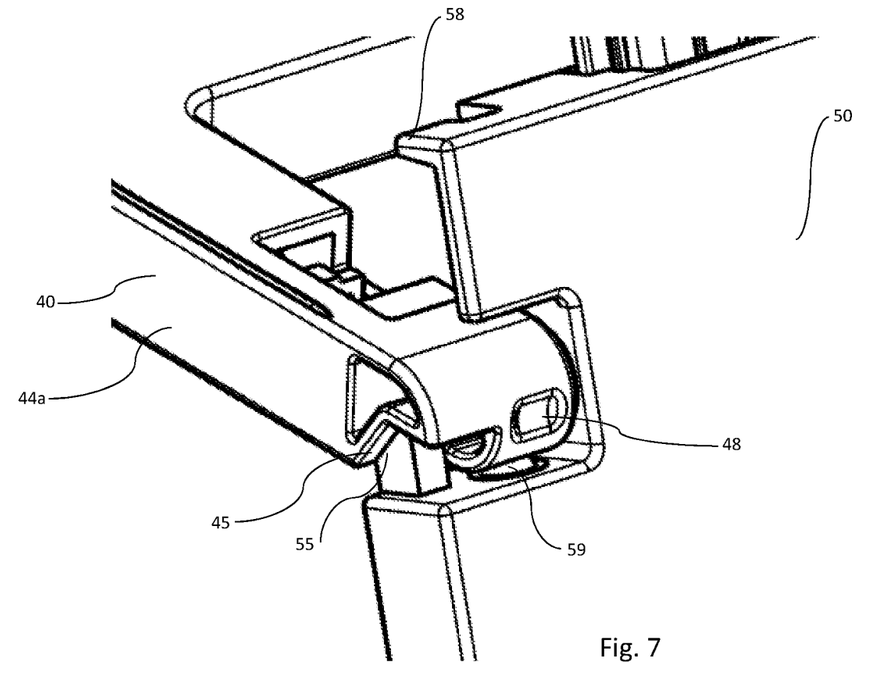
FIG. 7 is a perspective view showing the connection between the link arm and the device support of the portable electronic device support assembly according to one embodiment.

Referring now to FIG. 7, the device support 50 may comprise a resiliently biased element 59 that is biased towards the link arm 40 at the pivot point between the device support 50 and link arm 40. The link arm 40 may comprise a corresponding recess 48 that is configured to receive the resiliently biased element 59 of the device support 50 when the device support 50 and link arm 40 are relatively aligned. Rotation of the device support 50 away from the aligned position with respect to the link arm 40 may be resisted by the resiliently biased element 59, which is biased into the recess 48. However, the resilience of the resiliently biased element is configured such that the biasing may be overcome by a user such that the device support 50 may be rotated away from the aligned position relative to the link arm 40. By way of example, the resiliently biased element 59 may have an arcuate surface that may facilitate retraction of the resiliently biased element as the device support 50 is rotated away from the aligned position.

Although not depicted, the link arm 40 may comprise a further recess into which the resiliently biased element 59 may extend when the device support 50 is in the deployed position relative to the link arm 40. Such a further recess may assist in securing the device support 50 in the deployed position. Whether or not an additional recess is provided, the link arm 40 and device support 50 may comprise corresponding abutment surfaces 45, 55 that serve to interact and limit rotation of the device support relative to the link arm.

Figure 8:
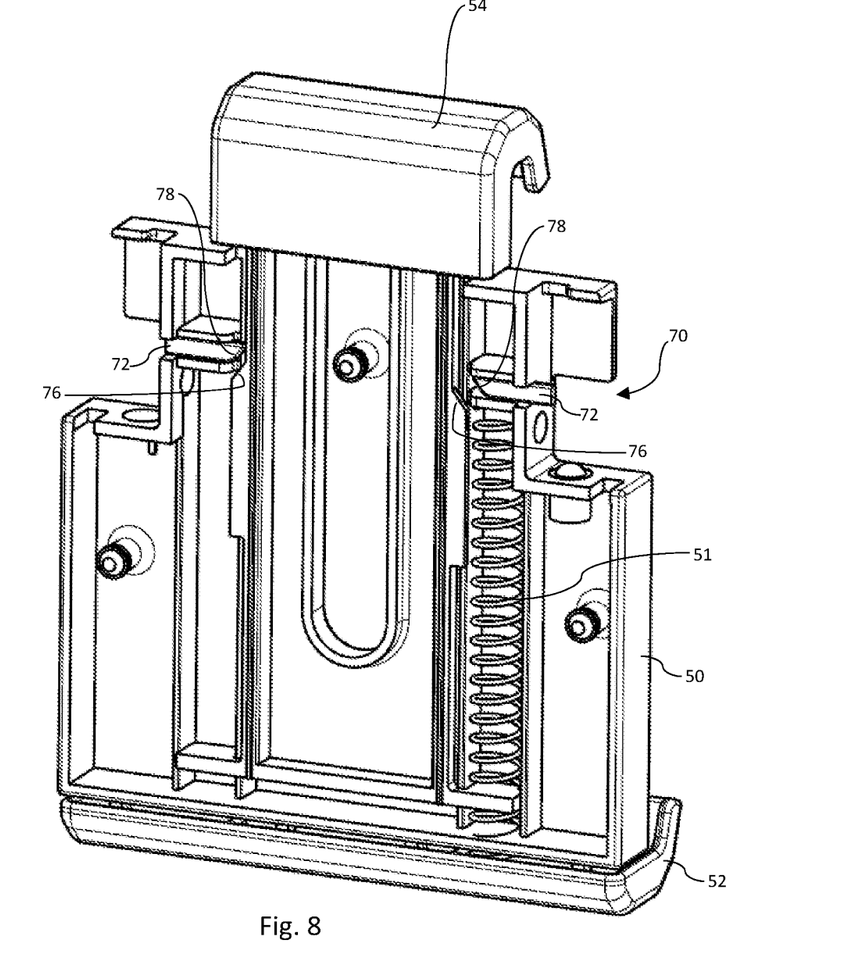
FIG. 8 is a rear perspective view of the device support according to one embodiment of the present disclosure.
Figure 9A:
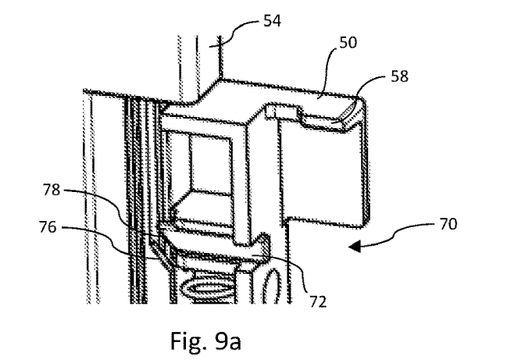
FIG. 9a is a partial perspective view showing operation of a further latching mechanism with a further latch in a disengaged position.
Figure 9B:
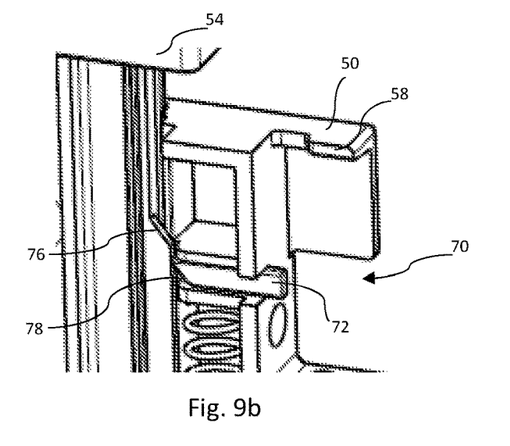
FIG. 9b is a partial perspective view showing operation of a further latching mechanism with a further latch in an engaged position.
Figure 9C:
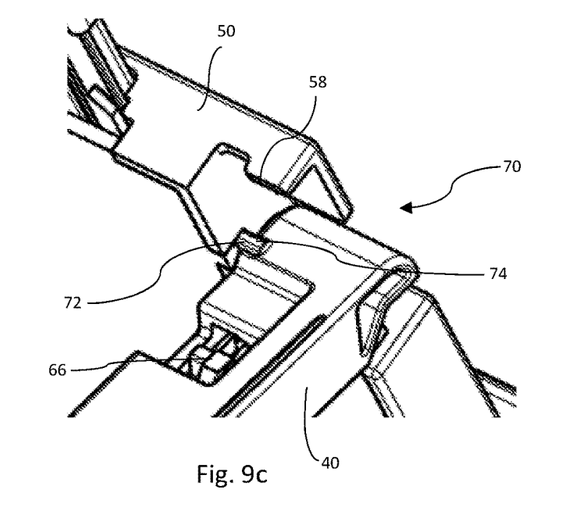
FIG. 9c is a partial perspective view showing operation of a further latching mechanism with a further latch in an engaged position.

With reference to FIGS. 8 and 9, the support assembly 10 may further comprise a further latching mechanism 70 configured to resist movement of the device support 50 relative to the link arm 40 when in the deployed position. In particular, the further latching mechanism 70 may comprise a further latch 72 movably, e.g., slidably, coupled to the device support 50. The further latch 72 may extend into a corresponding recess 74 in the link arm to lockingly engage the device support 50 relative to the link arm 40. The further latch 72 may be resiliently biased into a disengaged position, such as by virtue of a spring (not shown). By contrast, movement of the clamp 54 in an upwards direction may cause the further latch 72 to move towards the engaged position. The clamp 54 may be connected to a further cam surface 76, which moves with the clamp 54. A corresponding surface 78 of the further latch 72 may follow the further cam surface 76 such that the further latch 72 is urged into the engaged position as the clamp 54 moves away from its lowermost position (which may be lower than an anticipated position of the clamp when clamping a portable electronic device 20). The further latch 72 may be orientated in the lateral direction and may move in the lateral direction between the disengaged and engaged positions. A pair of further latches 72 may be provided with one on either side of the device support 50, each further latch 72 engaging corresponding recesses 74 in respective first and second arm portions 44a, 44b.

In an alternative arrangement an interaction between the portable electronic device 20 and the further latching mechanism may cause the further latch(es) to move into the engaged position. For example, as the portable electronic device is placed on the device support it may move a movable element, which in turn moves the further latch(es).

As depicted in the sequence of positions shown in FIGS. 2a-2f, the device support 50 may rotate between the deployed and stowed positions so that a bottom end of the device support when in the deployed position becomes a top end when in the stowed position. However, it is also envisaged that the link arm may simply slide horizontally, into the housing pocket 30 without necessarily rotating. In which case, an end of the latch member may move in a direction with a component perpendicular to the sliding direction. For example, the latch member may instead of sliding relative to the link arm 40, may rotate between latch positions.

It will be appreciated that the sequence of positions depicted in FIGS. 2a-2f may be reversed when it is desired to stow away the support assembly 10. When it is desired to move the support assembly 10 into the stowed position, the clamp 54 may be lowered, thereby releasing the further latching mechanism 70. The device support 50 may then be rotated relative to the link arm 40 and into the aligned position as depicted in FIG. 2c. In the aligned position, the resiliently biased element 59 has engaged the link arm recess 48 so as to hold the device support 50 in the aligned position. Also, the engaging portion 58 of the device support 50 will have interacted with the cam surface 62 of the latch member so as to retract the latch member from the housing recess. The link arm 40 is then free to rotate and/or slide relative to the housing 30. The device support 50 and link arm 40 may then together move into the housing pocket 32 so as to be stowed away.

It will be appreciated by those skilled in the art that although the invention has been described by way of example, with reference to one or more exemplary examples, it is not limited to the disclosed examples and that alternative examples could be constructed without departing from the scope of the invention as defined by the appended claims.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A portable electronic device support assembly for a vehicle, the portable electronic device support assembly comprising:
   a housing for placement in a trim portion of the vehicle;
   a link arm slidably coupled to the housing at a first end of the link arm;
   a device support configured to receive a portable electronic device and rotatably coupled to the link arm at a second end of the link arm, wherein the link arm and the device support are movable between a stowed position in a pocket of the housing, and a deployed position extending from the housing; and a latching mechanism configured to resist movement of the link arm in the deployed position, the latching mechanism comprising a first latch and a second latch, the first and second latches being movably coupled to the link arm, wherein at least one of the first and second latches is resiliently biased such that the at least one of the first and second latches engages a recess in the housing when the link arm is in the deployed position, wherein an interaction between the device support and the latching mechanism retracts the at least one of the first and second latches from the recess as the device support rotates relative to the link arm when moving towards the stowed position, wherein the link arm comprises a first arm portion and a second arm portion laterally spaced apart from the first arm portion, the device support being provided between the first and second arm portions and rotatably coupled at distal ends of the first and second arm portions, and wherein the first and second arm portions define a space therebetween for receiving a portion of the device support when in the stowed position, and wherein the first and second latches extend into the first and second arm portions, respectively.

2. The portable electronic device support assembly of claim 1, wherein the at least one of the first and second latches comprises a cam surface and the device support comprises an engaging portion configured to interact with the cam surface as the device support rotates relative to the link arm when moving towards the stowed position.

3. The portable electronic device support assembly of claim 2, wherein the cam surface is provided at or towards a first end of the at least one of the first and second latches.

4. The portable electronic device support assembly of claim 3, wherein the at least one of the first and second latches comprises a second end configured to engage the recess of the housing.

5. The portable electronic device support assembly of claim 4, wherein the at least one of the first and second latches is provided within a cavity of the link arm, wherein the second end of the at least one of the first and second latches protrudes from the cavity.

6. The portable electronic device support assembly of claim 2, wherein the device support is configured to rotate relative to the link arm about a pivot point between ends of the device support.

7. The portable electronic device support assembly of claim 1, wherein the at least one of the first and second latches is slidably disposed relative to the link arm.

8. The portable electronic device support assembly of claim 1, wherein the latching mechanism comprises a spring configured to resiliently bias the at least one of the first and second latches into engagement with the recess of the housing.

9. The portable electronic device support assembly of claim 1, wherein the device support and the link arm are aligned once the device support has interacted with the latching mechanism to retract the at least one of the first and second latches.

10. The portable electronic device support assembly of claim 1, wherein the link arm is slidably and rotatably coupled to the housing at the first end of the link arm.

11. The portable electronic device support assembly of claim 1, wherein the device support is configured to rotate so that a bottom end of the device support when in deployed position becomes a top end when in the stowed position.

12. The portable electronic device support assembly of claim 1, wherein one of the device support and the link arm comprises a resiliently biased element and the other of the device support and the link arm comprises a recess for receiving the resiliently biased element, the resiliently biased element and the recess being configured to provide an initial resistance to the relative rotation of the device support and the link arm.

13. The portable electronic device support assembly of claim 1, wherein the device support comprises a ledge for receiving a first edge of the portable electronic device, and wherein the device support further comprises an adjustable clamp for receiving a second edge of the portable electronic device opposite the first edge.

14. The portable electronic device support assembly of claim 1, wherein the portable electronic device support assembly further comprises a further latching mechanism configured to resist movement of the device support relative to the link arm in the deployed position.

15. A portable device support assembly comprising:
a housing;
a link arm slidably coupled to the housing at a first end of the link arm;
a device support configured to receive a portable device and rotatably coupled to a second end of the link arm and movable between a stowed position in a pocket and a deployed position; and
a latching mechanism configured to resist movement of the link arm in the deployed position, wherein the latching mechanism comprises a first latch and a second latch, the first and second latches being movably coupled to the link arm, wherein at least one of the first, and second latches is resiliently biased such that the at least one of the first and second latches engages a recess in the housing when the link arm is in the deployed position extending from the housing, wherein an interaction between the device support and the latching mechanism retracts the at least one of the first and second latches from the recess as the device support rotates relative to the link arm when moving towards the stowed position, wherein the link arm comprises a first arm portion and a second arm portion laterally spaced apart from the first arm portion, the device support being provided between the first and second arm portions and rotatably coupled at distal ends of the first and second arm portions, wherein the first and second min portions define a space therebetween for receiving a portion of the device support when in the stowed position, and wherein the first and second latches extend into the first and second arm portions, respectively.

16. A vehicle comprising:
a trim portion; and
a portable electronic device support assembly comprising:
a housing in the trim portion;
a link arm slidably coupled to the housing at a first end of the link arm;
a device support configured to receive a portable electronic device and rotatably coupled to the link arm at a second end of the link arm, wherein the link arm and the device support are movable between a stowed position in a pocket of the housing, and a deployed position extending from the housing; and
a latching mechanism configured to resist movement of the link arm in the deployed position, the latching mechanism comprising a first latch and a second latch, the first and second latches being movably coupled to the link arm, wherein at least one of the first and second latches is resiliently biased such that the at least one of the first and second latches engages a recess in the housing when the link arm is in the deployed position, wherein an interaction between the device support and the latching mechanism retracts the at least one of the first and second latches from the recess as the device support rotates relative to the link arm when moving towards the stowed position, wherein the link arm comprises a first arm portion and a second arm portion laterally spaced apart from the first art portion, the device support being provided between the first and second arm portions and rotatably coupled at distal ends of the first and second arm portions, and wherein the first and second arm portions define a space therebetween for receiving a portion of the device support when in the stowed position, and wherein the first and second latches extend into the first and second arm portions, respectively.

\* \* \* \* \*

UNITED STATES PATENT AND TRADEMARK OFFICE
CERTIFICATE OF CORRECTION

PATENT NO. : 10,814,797 B2
APPLICATION NO. : 15/957119
DATED : October 27, 2020
INVENTOR(S) : Thain et al.

Page 1 of 1

It is certified that error appears in the above-identified patent and that said Letters Patent is hereby corrected as shown below:

In the Claims

Column 10; Claim 15, Line 49:
"min" should be --arm--.

Signed and Sealed this
Nineteenth Day of January, 2021

Andrei Iancu
*Director of the United States Patent and Trademark Office*